June 15, 1943.  H. S. CAMPBELL  2,321,572
ROTATIVE WINGED AIRCRAFT
Filed March 16, 1940  4 Sheets-Sheet 1

INVENTOR:
Harris S. Campbell
BY
Symmestvedt + Lechner
ATTORNEYS.

Patented June 15, 1943

2,321,572

UNITED STATES PATENT OFFICE 2,321,572

ROTATIVE WINGED AIRCRAFT

Harris S. Campbell, Bryn Athyn, Pa., assignor to Autogiro Company of America, Willow Grove, Pa., a corporation of Delaware Application March 16, 1940, Serial No. 324,387

32 Claims. (Cl. 244—17)

This invention relates to rotative winged aircraft, and while many features of the invention are applicable to rotative winged aircraft of a variety of types, the invention is especially suitable to the powered rotor type in which at least a portion of the propulsive force for translational flight is derived from a horizontal component of the rotor thrust.

In aircraft of this class it has been proposed to effect translational flight by tilting the entire machine, including the rotor, to an inclined position such that the rotor thrust has the desired horizontal component. This prior proposal has a number of disadvantages, including the fact that, under various conditions of flight, the occupants are seated in more or less uncomfortable positions because of the tilt of the machine. In addition, tilt of the entire machine results in an aerodynamically inefficient attitude with respect to the translational flight wind.

In accordance with one aspect of the invention, provision is made for tilting a powered rotor with respect to the body or fuselage, preferably about a transverse axis passing close to the center of gravity of the machine as a whole. Thereby, hovering and translational flight at various speeds is provided for while maintaining the fuselage in a substantially predetermined attitude.

The invention further contemplates improvement in flight control of aircraft of the class under consideration, whereby to improve the maneuverability of this type of aircraft. With this in mind the invention provides a novel and effective control system, operative to control not only the longitudinal and lateral attitude of the machine but also the direction of flight.

More specifically, in accordance with the invention, mechanism is provided for controllably shifting the lift line of the powered rotor for attitude control purposes, this mechanism being combined with the feature first discussed above, i. e., tilting of the rotor with respect to the body on a transverse axis passing close to the center of gravity. The invention, moreover, provides combination of the features or functions mentioned in a manner permitting independent actuation of the several controls, and further providing for constant delivery of power to the rotor notwithstanding tilting of the rotor and/or shifting of the lift line thereof.

Although many of the features, including those mentioned above, are useful in an aircraft having a different number and arrangement of rotors, the invention is particularly adapted for use in an aircraft having two rotors arranged in side-by-side relation, the two rotors turning in opposite directions so that the torque of one balances that of the other. In its application to this specific form of aircraft, the invention contemplates provision of controllable means for conjointly tilting both rotors about a transverse axis passing close to the center of gravity of the machine, whereby to set up more or less of a horizontal thrust component for translational flight.

The control system for lateral and longitudinal attitude control and for directional control, as applied to a machine having side-by-side rotors, contemplates provision of mechanism for angularly shifting the lift lines of the two rotors with respect to the center of gravity of the machine, preferably in longitudinal vertical planes, differential angular shifting of the lift lines being employed for directional control, and conjoint shifting of the lift lines in the same sense being employed for longitudinal attitude control. In accordance with the invention, lateral attitude control is obtained by the employment of non-rotative differentially movable control surfaces arranged toward opposite sides of the longitudinal plane of symmetry of the craft, or alternatively by inversely varying the mean blade pitch of the two rotors.

The invention still further contemplates provision of means for simultaneously increasing or decreasing the mean blade pitch of both rotors in the same sense, all of the several controls being worked out to provide for independence of operation of any one regardless of the adjustment of any other.

In accordance with another aspect of the invention, an effective coordinating system is provided for the controls referred to above.

Other objects and advantages will appear as this description proceeds, reference now being made to the accompanying drawings illustrating embodiment of the invention in a twin rotored machine, in which drawings—

Figure 1:
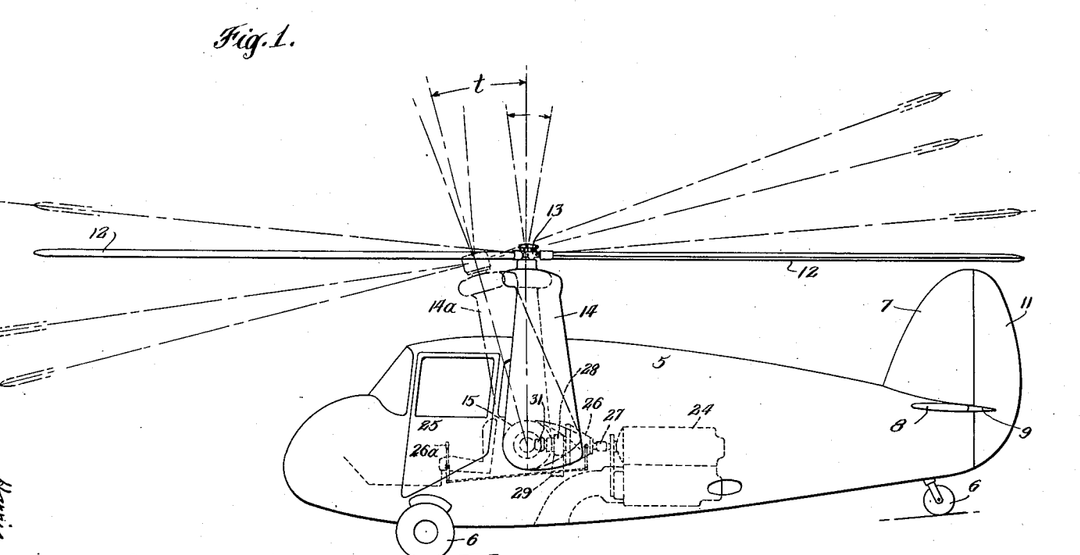
Figure 1 is a side elevational outline view of the aircraft, with dot and dash line showings of different positions of adjustment of the rotors.
Figure 2:
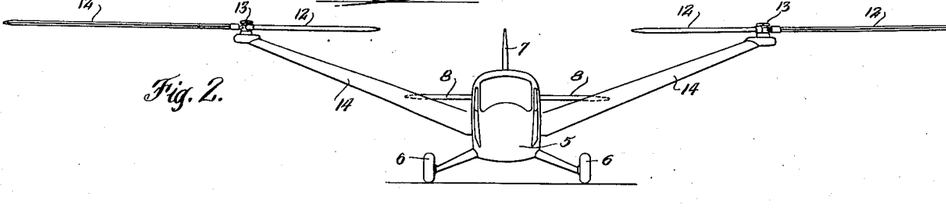
Figure 2 is a front elevational outline view of the aircraft of Figure 1, Figure 2 being on a reduced scale.
Figure 4:
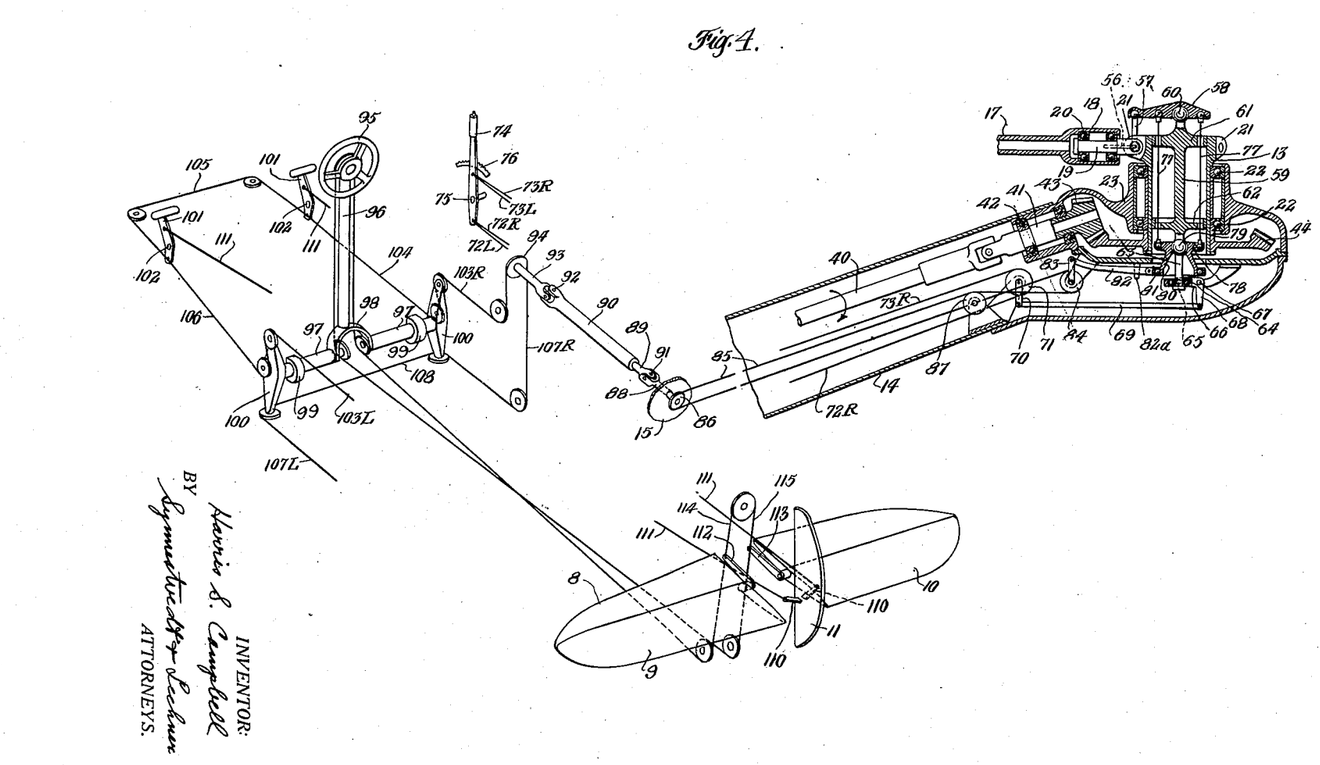
Figure 4 is a somewhat diagrammatic perspective view of portions of the control system, illustrating also one of the rotor hubs and its supporting outrigger in vertical section, with control and driving connections associated therewith.

In Figures 1 and 2, the body or fuselage of the air craft is indicated by the numeral 5, the body being provided with suitable landing gear such as wheels 6 and with tail surfaces which may incorporate a fixed vertical fin 7 and fixed horizontal fins 8—8, together with differentially movable horizontal surfaces 9 and 10 (see also Figure 4). A rudder 11 may also be included, although this may not be necessary for all types of machines.

Each rotor preferably includes a plurality of articulated blades 12, for example three blades, the blades being secured to a hub 13 which is rotatively mounted at the upper outer end of an outrigger 14. The two outriggers 14—14 (see Figures 2 and 3) desirably take the form of cantilever tubular members which extend downwardly and inwardly toward the side walls of the fuselage and are there joined with the transverse tube or support 15 projecting through the body and journalled therein by means of bearings 16—16 providing an axis for tilting of the outriggers and rotors, which axis extends transversely of the aircraft preferably at or close to the center of gravity of the entire machine, so that tilting movements of the rotors about said axis will not set up appreciable moments tending to change the longitudinal attitude of the body. In Figure 1 the full line showing of the outrigger and rotor indicates the position for vertical flight or hovering, the dot and dash showing 14a indicating a rotor position suitable for translational flight. This adjustment covers the range indicated by the arrow t.

Mounting of each individual rotor and of the blades thereon is best illustrated in Figure 4, which shows the right-hand rotor hub (the rotor hub to the right of the pilot when seated in the machine). Each blade is provided with a root end mounting member 17 having a casing 18 formed at its inner end adapted to receive spindle 19 on which the casing is journalled by means of bearings 20. The axis of spindle 19 is preferably substantially coincident with the longitudinal axis of the blade, so that blade movement about this axis effects pitch change thereof. The inner end of spindle 19 is pivotally connected with pairs of apertured lugs 21 projecting from the hub member 13 to provide a "flapping" pivot for the blade. The lower cylindrical portion of the hub member is journalled by bearings 22 in a non-rotative hub support 23 carried at the upper outer end of the outrigger 14. If desired, the pivotal blade mounting may further include a "drag" pivot axis, located either inboard or outboard of the pivots described above, and providing freedom for movement of the blade in a direction generally fore and aft within its mean rotative path of travel.

The rotors are adapted to be driven by an engine 24 (see Figure 1) arranged in the body, preferably to the rear of the occupant's cabin 25. This relative disposition of the motor and the occupant's compartment aids in providing the desired location for the transverse rotor support 15. The rotor support 15, being arranged between the engine and the occupant's compartment may, therefore, conveniently be disposed along the transverse axis intersecting the center of gravity of the aircraft.

The rotor drive transmission preferably incorporates reduction gearing and clutches, desirably both a manually operable and an overrunning clutch, the latter of which is indicated at 27. Gearing and a manually operable clutch may be conveniently arranged in a transmission casing indicated at 26 into which the engine shaft extends from the clutch 27. The manually operable clutch may be provided with a controlling lever 26a arranged in the pilot's compartment. The power take-off shaft projects from the forward side of transmission casing 26 and may be supported by a bearing 28 carried on fixed structure 29. The power take-off shaft further projects through an aperture 30 formed in the transverse rotor supporting tube 15 (see Figure 3), and interiorly of the rotor support the shaft carries a driving gear 31 meshing with a driven gear 32 fixed on shaft 33, which is journalled in the rotor supporting tube by means of bearings 34 and 35—35. The aperture 30 in the wall of tube 15 is elongated circumferentially of the tube to avoid interference with rotative movement of the tube and rotor mounts when adjusting the inclination of the rotors.

Figure 3:
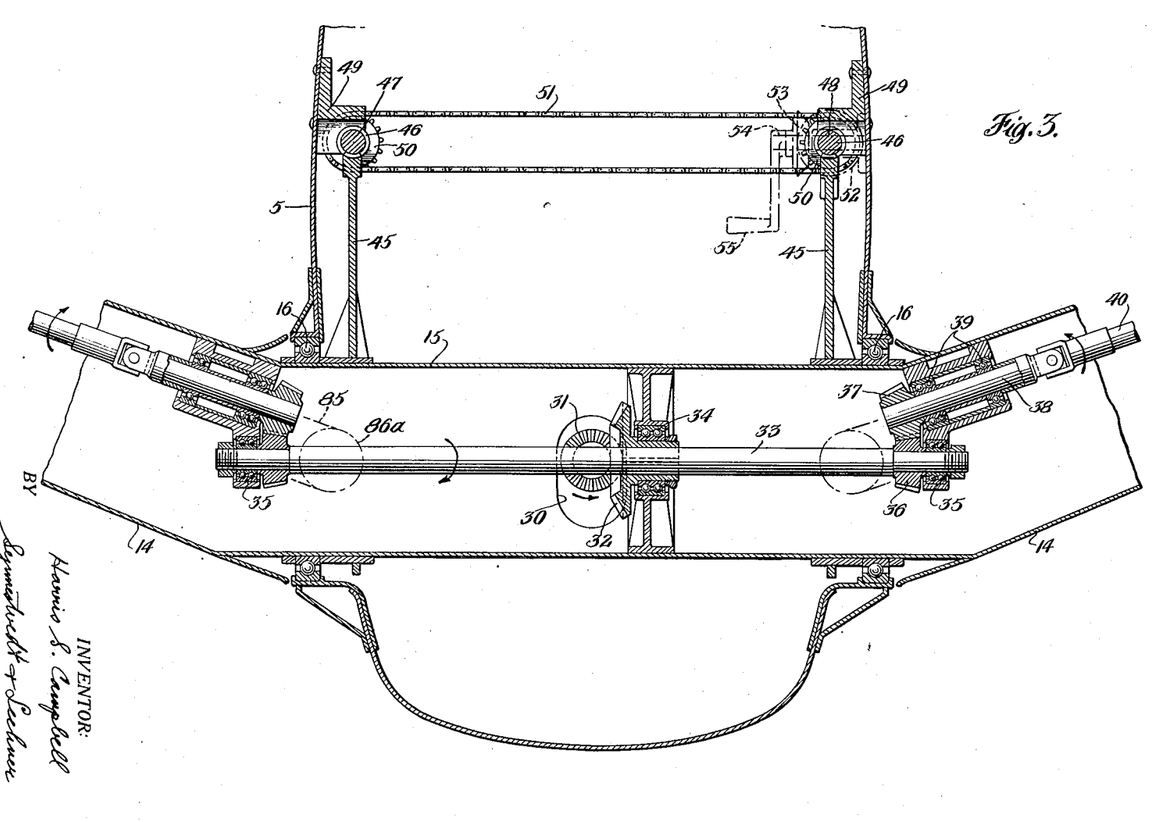
Figure 3 is a transverse sectional view through the body of the aircraft of Figures 1 and 2, showing the tiltable mounting for the rotor supports, and portions of the rotor drive mechanism, this view being on a considerably enlarged scale.

From examination of Figures 3 and 4, it will be seen that the drive to each rotor takes power from shaft 33, for which purpose each rotor drive includes a pair of cooperating gears 36—37, the former of which is fixed on shaft 33 and the latter on shaft 38 mounted within the outrigger 14 by bearings 39. Shaft 38, in turn, is universally coupled with shaft 40 which extends upwardly through the outrigger 14 and toward its upper end is again universally coupled with another shaft 41 journalled in the outrigger by bearings 42. Shaft 41, in turn, carries a gear 43 which meshes with ring gear 44 which is splined or otherwise fixed to the lower end of the rotative hub 13.

Obviously this entire rotor drive mechanism is arranged so as to accommodate tilting movements of the rotors and the supporting outriggers therefor as a unit.

In turning to the control system provided in accordance with the invention, attention is first directed to the showing, in Figure 3, of the control provided for conjoint fore and aft tilting of the rotor supports. As here shown, the tube 15 has secured thereto a pair of large radius worm wheel segments 45—45, projecting upwardly from the tube to cooperate with worms 46—46 carried by shafts 47 and 48, these two shafts being journalled in a suitable manner as by brackets 49—49. The two shafts 47 and 48 further are provided with sprockets 50—50 which are interconnected by a chain 51 to provide for conjoint actuation of the two worms. Shaft 48 is preferably extended forwardly to a point within the occupant's compartment and there carries a bevel gear 52 meshing with bevel gear 53 mounted on a shaft 54 adapted to be rotated by the handle or crank 55.

Actuation of the crank 55, therefore, effects conjoint fore and aft tilting of the outriggers and of the rotors carried thereby about a transverse axis through a range such as indicated at t in Figure 1, whereby to control the translational flight speed of the machine.

One form of control system (for attitude and directional control) is shown in Figure 4, and with respect to this system it is first noted that at least some of the controlling functions are desirably effected by tilting the thrust lines of the two rotors. While this may be accomplished by actual tilting of the physical axis or hub of each rotor (tilting mountings being disclosed, for example, in the copending Bennett application filed November 23, 1938, Serial No. 242,057, which could be adapted for the purpose), there are special advantages herein obtained by employing mechanism for periodic differential change of blade pitch to effect the shifting of the lift lines of the rotors. This mechanism further includes means for simultaneously changing the pitch of all blades of each rotor in the same sense, whereby to increase or diminish the rotor thrust and thus introduce control in a vertical sense for hovering, rising or descending.

The pitch change mountings of the individual blades (including cooperating parts 18 and 19 described above) are utilized in the control system just mentioned. The pitch value of the blades is placed in the hands of the pilot by a control system which may be traced as follows:

Beginning at the blade to the left of the hub shown in Figure 4, the housing 18 is provided with a laterally positioned inwardly extending arm 56 universally jointed with the lower end of link 57, the upper end of which is universally connected with a rocker member 58 which is mounted on part 59 by means of a universal or ball and socket joint 60 arranged on the hub axis. Member 59 has a pair of spaced disk-like portions 61 and 62 which are vertically slidable in the interior of hub member 13 but which are keyed to the hub member for rotation therewith.

Member 59 further carries a downwardly projecting stem 63 on which is journalled a non-rotative collar 64, the latter being provided with oppositely projecting pivot pins, as at 65, cooperating with slots in the prongs of a forked arm 66 of a bell crank mounted at 67. The other arm 68 of this bell crank is coupled by a link 69 with a crank 70 carried by the mounting shaft of pulley 71. Pulley 71 may be rotated by means of a cable system, the two runs 72R and 73R of which extend downwardly through the outrigger 114 and over suitable guide pulleys and the like to the controlling lever 74 pivotally mounted at 75, the lever 74 having a ratchet device cooperating with quadrant 76, whereby to maintain any desired mean pitch setting.

The foregoing portion of the control system provides for simultaneous increase and decrease of the pitch of all blades of the rotor in accordance with fore and aft movements of the control lever 74.

Since the direction of rotation of the rotors is such that the blades thereof, during translational flight, advance into the flight wind on the sides of the rotors which are adjacent to each other, the blade at the left-hand side of the hub in Figure 4 occupies a position on the advancing side of that rotor, and since the pitch control arm 56 for that blade projects forwardly and inwardly therefrom, raising of link 57 effects an increase of pitch and lowering of link 57 a decrease thereof. Therefore, with control connections as described above, a rearward motion of lever 74 will raise the blade pitch and a forward motion of the lever will decrease the blade pitch. In this arrangement it is contemplated that the mean pitch of both rotors is made controllable in the same sense by the single lever 74, the connections 72L and 73L for the rotor not shown in Figure 4 (for the left-hand rotor) being coupled with lever 74 either directly or through the adjacent portions of cable lengths 72R and 73R.

For directional control, particularly when the aircraft has no substantial translational flight speed, the blade pitch of the two rotors is differentially controllable in a manner to effect differential angular shift of the lift lines of the two rotors in longitudinal vertical planes. The mechanism provided for this purpose is further controllable to effect conjoint tilting of the thrust lines of the two rotors in said longitudinal vertical planes whereby to control the longitudinal attitude of the machine.

The foregoing is accomplished by periodic tilting of the rocker member 58 at the top of the hub on the universal mounting 60 therefor. This tilting movement is effected by four equally spaced links or cables, two of which appear at 77—77, extending downwardly from the rocker member 58 through apertures formed in the two disk parts 61 and 62, the cables being connected at their lower ends with another rocker member 78 in the form of a ring universally mounted at 79 on the stem 63. A cone 80 projects downwardly from the ring 78 and has journalled thereon a non-rotative ring 81 which is coupled by means of link 82 with a crank 83 rotatable with pulley 84. Fork prongs 82a embracing link 82 (or some equivalent means) may be used to restrain tilting of the cone 80 in a plane at right angles to the path of movement of link 82. Pulley 84 is rotatable by means of a closed circuit cable system 85 which cooperates also with pulley 86, one run of the cable passing over idler 87 mounted in the outrigger 14.

The position of pulley 86 is indicated in chain dotted lines in Figure 3 at 86a, being located in front of shaft 33 within the cylindrical rotor hub support 15. The mounting shaft 88 for pulley 86 is journalled in and projects through the cylindrical wall of the rotor support 15 (see Figure 4). Additional actuating connections extend forwardly from shaft 88 in the pilot's compartment, these additional connections including shafts 89 and 90 telescopically but non-rotatively associated with each other, shaft 89 further being universally connected with shaft 88 as indicated at 91. Shaft 90 is, in turn, universally coupled at 92 with another shaft 93 adapted to be journalled in fixed structure, which shaft 93 carries a pulley 94 in engagement with a closed circuit cable system described herebelow.

It will be understood that the control connections just described are duplicated for the left-hand rotor, which has been omitted from Figure 4 for the sake of clarity. It is here further noted that the joints between shafts 88, 89, 90 and 93 serve to accommodate adjustment movement of the rotor supporting tube 15 and the outriggers which extend therefrom. Similar shafts and joints may be employed in the operating cable (72—73) provided for simultaneous pitch change, or for any other operating cables which must be extended from the pilot's compartment to the rotor hubs.

The pilot's control organs include a hand wheel 95 rotatively mounted toward the upper end of a column 96, which column is connected with transverse shafts 97—97 by means of an interconnecting yoke 98. Shafts 97 are provided with supporting bearings 99—99 mounted on fixed structure, so that the control wheel 95 and column 96 are tiltable fore and aft.

Shafts 97 further carry generally upright double-ended arms 100—100 serving to carry certain cable mounting pulleys referred to below.

The system further includes a pair of pedals, of rudder type, indicated at 101—101, these pedals being mounted in fixed structure as at 102.

A closed circuit cable system serves to interconnect various of the parts just described, which cable system may briefly be traced as follows:

A run 103R extends from pulley 94 to a pulley at the upper end of one of the arms 100. The cable then continues partway around and under said pulley and thence behind and under a subjacent pulley, from which the cable extends forwardly in a run 104 for connection with the lower arm of right rudder pedal 101. A cable run 105, passing over suitable guide pulleys, interconnects the lower arms of both rudder pedals, and after a run (106) the cable engages a pair of pulleys on the upper end of the left-hand arm 100 in a manner corresponding to that described above, the cable length 103L being extended rearwardly to the pulley 94 (not shown) of the control system for the left-hand rotor.

Returning again to the pulley 94 for the right-hand rotor, it will be noted that the cable length 107R extends from this pulley to another one at the lower end of right-hand arm 100 and thence in a run 108 to the lower end of the left arm 100, from which a cable length 107L extends again for engagement with pulley 94 (not shown) for the left-hand rotor, at which latter pulley the circuit is completed.

By virtue of this system, fore and aft movement of the control wheel 95 and its supporting column 96 causes tilting of the arms 100—100 about the axis of bearings 99—99, in consequence of which displacement of the control wheel, for example, in a forward direction, results in a pull on cable lengths 103R and 103L and a release of cable lengths 107R and 107L. This causes rotation of pulleys 94 for both rotor control systems, and in each rotor the effect is transmitted through connections 93 to 88 and from there to cable 85, which causes movement of crank 83 and thereby tilts the cone 80 about joint 79.

For a forward displacement of the control stick the cone 80 is tilted, in a counterclockwise direction, about the ball mounting 79, and this causes the rocker member 58 to tilt downwardly at the left when viewed as in Figure 4 which, in turn, effects a decrease of pitch of the blades as they move on the advancing side of the rotor, and an increase of pitch of the blades as they move on the retreating side of the rotor. Since with blades pivoted to the hub on flapping pivots of the type herein illustrated, the effect of pitch change is manifested in a plane approximately at right angles to the diameter on which maximum periodic pitch decrease and increase is effected, the result of the foregoing control is a tilt of the thrust line of the rotor in a fore and aft plane. Moreover, with maximum periodic pitch decrease occurring when the blades pass on the advancing side of the rotor (and maximum increase when the blades pass on the retreating side) the sense of tilt of the thrust line is such as to swing the thrust line rearwardly below the rotor and thus rearwardly with respect to the center of gravity of the machine which, in turn, introduces a moment tending to nose the machine downwardly.

It will be understood that the control connections are correspondingly arranged for the two rotors and so coupled that forward movement of the control column 96 results in decrease of blade pitch on the advancing side of both rotors and increase of blade pitch on the retreating side of both rotors, as a result of which the machine tends to assume a nose-down attitude. Conversely, a rearward displacement of the control column 96 produces a nose-up effect.

A differential effect as between the two rotors is obtainable with the control system above described by actuation of one or the other of the two rudder pedals 101—101, and this portion of the control system is utilized at least in part for directional control, in accordance with the following:

Assuming actuation of the right-hand rudder pedal 101, the effect is to set up a periodic pitch increase of the blades of the right-hand rotor on the advancing side thereof and a periodic decrease of pitch of the blades of this rotor on the retreating side thereof, and further to set up a periodic pitch decrease of the blades of the left-hand rotor on the advancing side thereof and a periodic increase of pitch of the blades of this rotor on the retreating side thereof. In consequence, the thrust line of the right-hand rotor is tilted rearwardly (to pass the center of gravity forwardly thereof) and the thrust line of the left-hand rotor is tilted forwardly (to pass behind the c. g.), which action sets up a moment tending to rotate the machine about a vertical axis in the right-hand direction.

Preferably, this directional control is further supplemented by appropriate action of the rudder 11 which rudder, while not of appreciable effectiveness, in low speed or hovering flight, is, however, highly effective in the higher range of translational flight speeds. For control of the rudder, the latter may be equipped with a pair of horns 110 which are coupled by cables 111 with the pedals 101—101, these cables being broken out in the showing of Figure 4 to avoid confusion. Cables 111, it will be noted, are connected with the rudder pedals above their mounting pivots 102, in order to provide a sense of rudder deflection corresponding to the directional effect secured from differential movement of the thrust lines of the rotors.

The control system of Figure 4 still further incorporates means for setting up banking moments, such means taking the form of a pair of differentially movable elevator surfaces 9—10, which are actuable by means of arms 112 and 113 connected with oppositely movable runs 114—115 of a closed circuit cable system actuable by rotation of the control wheel 95. The manner of connection of this cable system with the control wheel will be plain from an examination of Figure 4.

Figure 5:
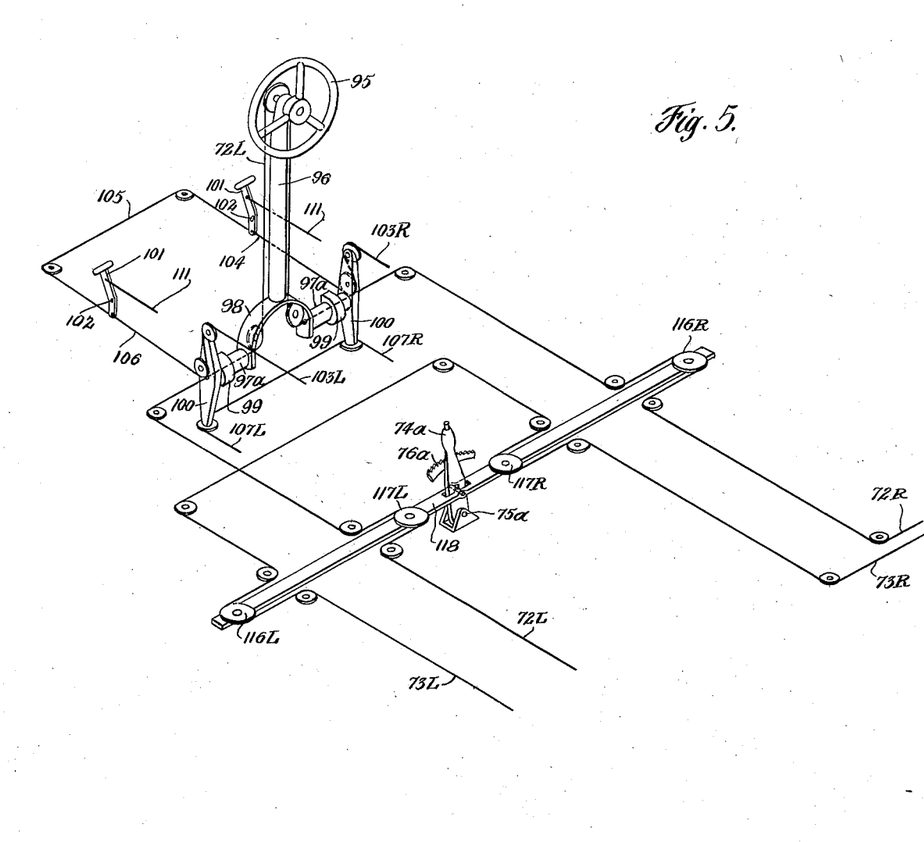
Figure 5 is a somewhat diagrammatic view similar to Figure 4, illustrating a modified control system.

In the modified system of Figure 5, several of the controls are similar to those described above in connection with Figure 4, as is indicated by the use of corresponding reference characters. Specifically, the control column 96 is mounted in the same general manner as in Figure 4 and its fore and aft pivotal movement is again employed for differential blade pitch change on the two rotors in senses providing for conjoint tilting of the lift lines of the two rotors in longitudinal vertical planes in the same direction. The rudder pedals 101—101 are again employed for differential blade pitch change in the two rotors in inverted senses, to effect differential shifting of the lift lines of the two rotors in said longitudinal vertical planes. Here also the rudder pedals may be connected, as by cables 111—111 with a rudder (omitted from Figure 5 for the sake of clarity).

In the system of Figure 5, however, the simultaneous pitch control lever 74 of Figure 4 has been replaced by a different form of mechanism and, in addition, connections are made to the pilot's control wheel 95 for the purpose of effecting increase and decrease of the mean blade pitch of the two rotors in inverted senses, whereby to set up banking moments, i. e., to control the attitude of the aircraft about its longitudinal axis.

While, if desired, the differentially operable tail surfaces 9—10 of Figure 4 may be retained in the arrangement of Figure 5 and coupled with the control wheel in the manner disclosed in Figure 4 (this portion of the system merely being omitted from the showing of Figure 5), the system of Figure 5 contemplates use of rotational movement of the pilot's control wheel 95 to perform the control function last referred to above, i. e., simultaneous pitch change of the two rotors in inverted senses for "banking" control. With this in mind cable lengths 72R and 73R, which are associated with the simultaneous pitch control mechanism for the right-hand rotor, are coupled with the control wheel 95 in the following manner:

The cable length 72R, after extending over a pulley 116R, passes through the hollowed mounting shaft 97a for the control column 96 and thence upwardly for engagement with a drum or pulley rotatable with the control wheel 95, the cable being extended downwardly therefrom in a length 72L and thence outwardly through the mounting shaft 97a, over pulley 117L, to complete its circuit by engagement with the simultaneous pitch control mechanism for the left-hand rotor (not shown in Figure 5). Cable length 73R, similarly extends over pulley 117R and thence over suitable guide elements to the pulley 116L, from which this cable length extends to the simultaneous pitch control mechanism for the left-hand rotor.

By virtue of the system just described, rotation of the hand wheel 95 effects an increase of the mean pitch of the blades of one rotor and a decrease of the mean pitch of the blades of the other rotor, whereby to relatively vary the thrust of the two rotors and thus introduce a banking moment. The sense of this pitch change is such that upon rotation of the control wheel 95 to the left (counterclockwise when viewed by the pilot) the mean pitch of the right rotor is increased and the mean pitch of the left rotor decreased. The converse takes place upon rotation of the wheel in a clockwise direction, and thereby instinctive banking control is provided.

In place of the simultaneous pitch control lever 74 of Figure 4, the arrangement of Figure 5 contemplates the employment of a lever 74a performing the same function, i. e., simultaneous increase and decrease of the mean pitch of both rotors in the same sense. This lever may be associated with a quadrant 76a and is pivotally mounted on a fixed part as at 75a. The lever has a pin and slot connection with a transverse slide-bar 118 on which all four of pulleys 116R, 116L, 117R and 117L are mounted. Each of these four pulleys, moreover, is disposed at the base end of a U-shaped loop in the associated cable run, suitable guide pulleys pivoted on fixed structure being employed to maintain the cable pattern, which is clearly illustrated in Figure 5. By virtue of the arrangement, movement of the control lever 74a to the right when viewed as in Figure 5 increases the depth of the U-loops in the cable lengths 72R and 72L, and decreases the depth in the cable lengths 73R and 73L, and this, in turn, effects increase of the mean blade pitch of both rotors. Obviously, movement of the lever 74a to the left effects decrease of the mean blade pitch of both rotors.

In accordance with the invention, a control system is provided incorporating means for control of the craft about the three major axes thereof, and means for controllably shifting the attitude of the rotors about a transverse axis passing close to the center of gravity, whereby to change the condition of flight from hovering to translational flight and to vary the horizontal component of the rotor thrust, so as to vary the translational flight speed.

This latter control, as hereinbefore mentioned, provides for normal maintenance of an approximately uniform longitudinal attitude of the body, regardless of the translational flight speed, and the several control systems are arranged so that in any position of adjustment of the outriggers, the thrust lines of the two rotors may be shifted with respect to the center of gravity either conjointly in the same sense, or differentially.

Still further, simultaneous change of the blade pitch of both rotors in the same sense (by means of the lever 74 of Figure 4 or 74a of Figure 5) may be employed to control ascension and descension or to provide for hovering flight.

According to the invention, this latter control (for simultaneous pitch change) provides a range of pitch adjustment such as to comprehend effective pitch settings not only for power driven flight, but also for autorotational actuation of the rotors, which may be employed for vertical descent without power, for instance, in the event of engine failure. In this case, the overrunning clutch 27 may be relied upon to provide free rotation of the rotors.

If desired, the simultaneous pitch control may also cover a range including a substantially zero pitch setting for the blades of the two rotors, whereby to reduce the rotational drag thereof and thus permit substantial overspeeding of the rotors while on the ground in preparation for a take-off. In effecting a take-off in this way, after the desired overspeed is attained, the pitch control lever may be moved to raise the blade pitch substantially and thereby utilize kinetic energy stored in the rotors to rapidly increase the rotor thrust and effect "jump" take-off.

Maneuvers such as those described above may readily be carried out, while retaining effective control, and it may be noted that the control system of Figure 5 is particularly advantageous in a machine capable of "jump" take-off, or hovering flight, since translational flight speed need not be relied upon for control about any of the three axes of the aircraft.

The control system of Figure 5, moreover, is effective to provide control in pitch, in yaw and in roll by means of control organs all of which operate on the rotors and all of which, furthermore, utilize the same control mechanism at the rotor hub, i. e., the mounting of the blades for pitch varying movement.

As above noted, moreover, many features of the invention are adaptable to rotary wing aircraft of a variety of types, and as will be apparent, at least most portions of the control system may be employed in a twin rotor machine in which the rotors are normally aerodynamically driven in flight. In the case of a machine of this type, a separate forward propulsion means is normally employed and the rotor drive system would, of course, only be used for starting the rotors prior to leaving the ground, this being desirably accomplished in the manner described above to effect a jump take-off, after which translational flight would continue under the influence of the separate propulsion means, the drive system being disconnected either by overrunning of the rotors, or more preferably by disengaging the manually operable clutch which is controllable by lever 26a.

It will be understood that various of the mechanisms described are illustrated somewhat diagrammatically, this being preferred from the standpoint of clarity in the drawings. It will also be understood that various changes may be made in certain of the control connections and the like without departing from the broad essentials of the invention. For instance, if desired, sprockets may be substituted in place of certain of the pulleys mentioned and cooperating chain lengths inserted in the cable circuits.

I claim:

1. An aircraft including a bladed sustaining rotor, means for tiltably moving the rotor about a generally transverse axis approximately containing the center of gravity of the aircraft, and means for shifting the lift line of the rotor with respect to the center of gravity of the aircraft.

2. An aircraft including a power driven rotor adapted for both sustension and propulsion, means mounting the rotor for tilting movement about a generally transverse axis approximately containing the center of gravity of the aircraft to provide for variation in the horizontal and vertical components of the rotor thrust, and controllable means for shifting the lift line of the rotor with respect to the center of gravity of the craft for attitude control purposes.

3. An aircraft including a pair of rotors arranged in side-by-side relation, controllable means for tilting said rotors about a generally transverse axis approximately containing the center of gravity of the aircraft, and controllable means for shifting the lift lines of said rotors with respect to the center of gravity of the craft for attitude control purposes.

4. An aircraft including a pair of rotors arranged in side-by-side relation, controllable means for tilting said rotors about a generally transverse axis approximately containing the center of gravity of the aircraft, and controllable means for effecting a shift in the relative positions of the lift lines of said rotors.

5. An aircraft including a pair of rotors arranged in side-by-side relation, controllable means for tilting said rotors about a generally transverse axis approximately containing the center of gravity of the aircraft, and controllable means for differentially shifting the lift lines of said rotors in generally longitudinal vertical planes.

6. An aircraft including a pair of rotors arranged in side-by-side relation, controllable means for tilting said rotors about a generally transverse axis approximately containing the center of gravity of the aircraft, and controllable means for simultaneously shifting the lift lines of the two rotors in the same sense in generally longitudinal vertical planes.

7. In an aircraft having a pair of side-by-side sustaining rotors, means providing for shift of the lift lines of said rotors in generally longitudinal vertical planes, non-rotative control surfaces arranged toward opposite sides of the longitudinal vertical mid plane of the craft, and a control system for shifting the lift lines of said rotors and for moving said control surfaces including an organ for directional control and a second organ movable in two senses for lateral and longitudinal attitude control, respectively, means connecting said first control organ with the rotors and providing for differential shift of the lift lines of the rotors in said longitudinal vertical planes, means connecting the second control organ with said non-rotative control surfaces and providing differential movement thereof upon movement of the second control organ in one sense, and means connecting the second control organ and said rotors and providing for conjoint shift of the lift lines of said rotors in the same direction upon movement of said second control organ in its other sense.

8. An aircraft including a pair of side-by-side sustaining rotors, mechanism providing for shift of the lift lines of said rotors for control purposes in a plurality of senses, two separately operatable control organs actuable by the pilot, means operatively associating one of said organs with said mechanism to effect conjoint shift of the lift lines of both rotors in like senses, and means operatively associating the other organ with said mechanism to effect relative alterations in position of said lift lines.

9. An aircraft including a pair of side-by-side sustaining rotors, mechanism providing for shift of the lift lines of said rotors for control purposes in a plurality of senses, a foot operated control organ, a manually operated control organ, means connecting the manually operated control organ with said mechanism and providing for conjoint shift of the lift lines of the two rotors in the same sense, and means connecting the foot operated control organ with said mechanism and providing for differential shift of the lift lines of the two rotors in opposite directions.

10. In an aircraft, a pair of side-by-side sustaining rotors configured to rotate in opposite directions whereby their reactive torques are largely neutralized when power driven, mechanism providing for altering the relative effects of the rotor thrusts with respect to the center of gravity of the craft, non-rotative control surfacing on the craft, and a control system for said mechanism and said surfacing including a manually operable control organ movable in a plurality of senses, means operatively associating said organ with said mechanism whereby to control the aircraft about one axis upon movement of said organ in one sense, and means operatively associating said organ with said surfacing to control the craft about another axis upon movement of said organ in a different sense.

11. An aircraft including a pair of side-by-side sustaining rotors, mechanism providing for shift of the lift lines of said rotors for control of the longitudinal attitude of the aircraft, non-rotative control surfaces arranged toward opposite sides of the longitudinal vertical midplane of the craft for control of the lateral attitude of the aircraft, and a control system for said mechanism and said surfaces including a manually operable control organ movable in two senses and coupled with said mechanism and said surfaces to effect longitudinal and lateral control upon movement in said two senses, respectively.

12. In an aircraft having a body and a pair of side-by-side sustaining rotors, for each rotor a supporting outrigger extended laterally from the body, means mounting said outriggers for conjoint tilting movement with respect to the body about a transverse axis, and controllable means for shifting the lift lines of the rotors with respect to the supporting outriggers and the body for attitude control purposes.

13. In an aircraft having a pair of side-by-side sustaining rotors, mechanism for effecting periodic change of blade pitch of said rotors to shift the lift lines thereof for control purposes, a rudder, and manually operable control means coupled with the rotors and with said rudder and providing for conjoint shift of the lift lines of the rotors and deflection of the rudder.

14. In an aircraft having a pair of side-by-side sustaining rotors, mechanism for effecting periodic change of blade pitch of said rotors to shift the lift lines thereof in generally longitudinal vertical planes for control purposes, a rudder, and manually operable control means coupled with the rotors and with said rudder and providing for conjoint differential shift of the lift lines of the rotors in said longitudinal vertical planes and for deflection of the rudder.

15. In an aircraft having a pair of side-by-side sustaining rotors, mechanism for effecting periodic change of blade pitch of said rotors to shift the lift lines thereof in generally longitudinal vertical planes for control purposes, a rudder, a control organ coupled with the rotors and providing for conjoint shift of the lift lines thereof in the same sense in said longitudinal vertical planes, and a second control organ coupled with the rotors and with said rudder and providing for conjoint differential shift of the lift lines of the rotors in said longitudinal vertical planes and for deflection of the rudder.

16. In an aircraft having a pair of bladed sustaining rotors arranged in side-by-side relation, mounting means for the rotors providing for tilting of the axes thereof about a transverse axis approximately containing the center of gravity of the aircraft, means providing for pitch change of the rotor blades, a control organ coupled with the rotor mounting means for effecting tilting movements of the rotors, and a control organ coupled with the rotor blades for effecting simultaneous increase or decrease of rotor blade pitch.

17. In an aircraft having a pair of bladed sustaining rotors arranged in side-by-side relation, mounting means for the rotors providing for tilting of the axes thereof about a transverse axis approximately containing the center of gravity of the aircraft, means providing for pitch change of the rotor blades, a control organ coupled with the rotor mounting means for effecting tilting movements of the rotors, a second control organ coupled with the rotor blades for effecting simultaneous increase or decrease of rotor blade pitch, and a third control organ coupled with the rotor blades for effecting a periodic differential pitch increase and decrease of the blades of each rotor.

18. In an aircraft having a pair of bladed sustaining rotors arranged in side-by-side relation, mounting means for the rotors providing for tilting of the axes thereof about a transverse axis approximately containing the center of gravity of the aircraft, means providing for pitch change of the rotor blades, a control organ coupled with the rotor mounting means for effecting tilting movements of the rotors, a second control organ coupled with the rotor blades for effecting simultaneous increase or decrease of rotor blade pitch, a third control organ coupled with the rotor blades for effecting a periodic differential pitch increase and decrease of the blades of each rotor in senses providing for conjoint tilting of the lift lines of the two rotors in the same direction, and a fourth control organ coupled with the rotor blades for effecting a periodic differential pitch increase and decrease of the blades of each rotor in senses providing for differential tilting of the lift lines of the two rotors in opposite directions.

19. In an aircraft having a pair of side-by-side sustaining rotors each incorporating a blade or blades mounted with freedom for pitch change movement, a control mechanism incorporating a pilot operable control element movable in two senses, a second pilot operable control element, control connections between the first control element and the rotor blades providing for conjoint shift of the lift lines of the two rotors in the same sense in longitudinal vertical planes upon movement of said first control element in one sense and for mean blade pitch increase and decrease of the two rotors in inverted senses upon movement of said first control element in the other sense, and control connections between the second control element and the rotor blades providing for differential shift of the lift lines of the two rotors in opposite senses in said longitudinal vertical planes.

20. In an aircraft having a pair of side-by-side sustaining rotors each incorporating a blade or blades mounted with freedom for pitch change movement, a control mechanism incorporating a pilot operable control element movable in two senses, and pitch control connections between said control element and the rotor blades providing for conjoint shift of the lift lines of the two rotors in the same sense in longitudinal vertical planes upon movement of the control element in one sense and for mean blade pitch increase and decrease of the two rotors in inverted senses upon movement of the control element in the other sense.

21. In an aircraft having a pair of bladed sustaining rotors arranged in side-by-side relation, a control system operatively connected with the rotors and incorporating a pilot operable control element movable in two senses, a second pilot operable control element, and control connections between the first control element and the rotors providing for conjoint shift of the lift lines of the two rotors in the same sense in longitudinal vertical planes upon movement of said first control element in one sense and for mean blade pitch increase and decrease of the two rotors in inverted senses upon movement of said first control element in the other sense, and control connections between the second control element and the rotors providing for differential shift of the lift lines of the two rotors in opposite senses in said longitudinal vertical planes.

22. In an aircraft having a pair of side-by-side sustaining rotors each incorporating a blade or blades mounted with freedom for pitch change movement, a control mechanism coupled with the rotor blades and incorporating controllable means for conjoint shift of the lift lines of the two rotors in the same sense in longitudinal vertical planes, controllable means for effecting mean blade pitch increase and decrease of the two rotors in inverted senses, and controllable means for effecting differential shift of the lift lines of the two rotors in opposite senses in said longitudinal vertical planes.

23. In an aircraft having a pair of side-by-side sustaining rotors each incorporating a blade or blades mounted with freedom for pitch change movement, a control mechanism coupled with the rotor blades and incorporating controllable means for conjoint shift of the lift lines of the two rotors in the same sense in longitudinal vertical planes, controllable means for effecting mean blade pitch increase and decrease of the two rotors in inverted senses, controllable means for effecting differential shift of the lift lines of the two rotors in opposite senses in said longitudinal vertical planes, and controllable means for effecting simultaneous increase and decrease of the mean rotor blade pitch of both rotors in the same sense.

24. In an aircraft having a pair of bladed sustaining rotors arranged in side-by-side relation, a control system operatively connected with the rotors and incorporating controllable means for conjointly tilting the rotor hubs about a transverse axis approximately containing the center of gravity of the aircraft, controllable means for conjointly shifting the lift lines of the two rotors in the same sense with respect to the center of gravity of the aircraft in longitudinal vertical planes, and controllable means for effecting mean blade pitch increase and decrease of the two rotors in inverted senses.

25. An aircraft including a sustaining rotor, means for tiltably moving the rotor about a generally transverse axis approximately containing the center of gravity of the aircraft, and controllable means for angularly shifting the lift line of the rotor with respect to its mount about a point spaced considerably above the center of gravity of the aircraft.

26. A construction according to claim 22, wherein the control mechanism comprises a control organ connected in common to a plurality of said controllable means and mounted for movement in a plurality of senses to respectively actuate the different controllable means connected thereto.

27. A construction according to claim 23, wherein the control mechanism comprises a control organ connected in common to a plurality of said controllable means and mounted for movement in a plurality of senses to respectively actuate the different controllable means connected thereto.

28. In an aircraft, a pair of bladed sustaining rotors positioned in side-by-side relation and arranged for rotation in opposite directions, and a flight control system for the craft operating by means of said rotors, the rotors having means providing for blade flapping, said system comprising separate control mechanisms for tilting the two rotor lift lines whereby they may be given inclinations relative to each other, and separate pitch-varying mechanism for the two rotors whereby their mean pitches may be varied relative to each other, and connections from the pitch-varying mechanisms of the two rotors coupled to a common control organ for unified operation.

29. In an aircraft, a pair of bladed sustaining rotors positioned in side-by-side relation and arranged for rotation in opposite directions, and a flight control system for the craft operating by means of said rotors, the rotors having means providing for blade flapping, said system comprising separate control mechanisms for tilting the two rotor lift lines whereby they may be given inclinations relative to each other, and separate pitch-varying mechanisms for the two rotors whereby their mean pitches may be varied relative to each other, connections from the pitch-varying mechanisms of the two rotors coupled to a common control organ for unified operation, and connections from the lift-line control mechanisms of the two rotors coupled to a common control organ for unified operation.

30. In an aircraft, a pair of bladed sustaining rotors positioned in side-by-side relation and arranged for rotation in opposite directions, and a flight control system for the craft operating by means of said rotors, the rotors having means providing for blade flapping, said system comprising separate control mechanisms for tilting the two rotor lift lines whereby they may be given inclinations relative to each other, separate pitch-varying mechanisms for the two rotors whereby their mean pitches may be varied relative to each other, and a control organ mounted for movement in two senses and coupled to the pitch-varying mechanisms of the two rotors for unified operation thereof by movement of said organ in one sense and also coupled to the lift-line control mechanisms of the two rotors for unified operation thereof by movement of said organ in another sense.

31. In an aircraft, a pair of bladed sustaining rotors positioned in side-by-side relation and arranged for rotation in opposite directions, and a flight control system for the craft operating by means of said rotors, the rotors having means providing for blade flapping, said system comprising separate control mechanisms for tilting the two rotor lift lines whereby they may be given inclinations relative to each other, and separate pitch-varying mechanisms for the two rotors whereby their mean pitches may be varied relative to each other, a control organ mounted for movement in two senses and coupled to the pitch-varying mechanisms of the two rotors for unified inverse operation thereof by movement of said organ in one sense and also coupled to the lift-line control mechanisms of the two rotors for unified parallel operation thereof by movement of said organ in another sense, and a separate control organ coupled to the lift-line control mechanisms of the two rotors for unified inverse inclinations of said lift lines.

32. In an aircraft, a pair of bladed sustaining rotors positioned in side-by-side relation and arranged for rotation in opposite directions, and a flight control system for the craft operating by means of said rotors, the rotors having means providing for blade flapping, said system comprising separate control mechanisms for tilting the two rotor lift lines whereby they may be given inclinations relative to each other, separate pitch-varying mechanisms for the two rotors whereby their mean pitches may be varied relative to each other, a control organ mounted for movement in two senses and coupled to the pitch-varying mechanisms of the two rotors for unified inverse operation thereof by movement of said organ in one sense and also coupled to the lift-line control mechanisms of the two rotors for unified parallel operation thereof by movement of said organ in another sense, a separate control organ coupled to the lift-line control mechanisms of the two rotors for unified inverse inclinations of said lift lines, and means for raising or lowering the mean pitch of both rotors simultaneously.

HARRIS S. CAMPBELL.